(12) United States Patent
Oas (10) Patent No.: US 6,168,414 B1
(45) Date of Patent: Jan. 2, 2001

(54) APPARATUS FOR CRYOGENIC STRETCH BLOW MOLDING

(75) Inventor: David C. Oas, Vandalia, OH (US)

(73) Assignee: Electra Form, Inc., Vandalia, OH (US)

( * ) Notice: Under 35 U.S.C. 154(b), the term of this patent shall be extended for 0 days.

(21) Appl. No.: 08/961,931

(22) Filed: Oct. 31, 1997

(51) Int. Cl.[7] .............................. B29C 49/12; B29C 49/66
(52) U.S. Cl. ............................ 425/526; 264/28; 264/528; 425/529; 425/535
(58) Field of Search ........................ 425/529, 535, 425/526; 264/28, 528

(56) References Cited

U.S. PATENT DOCUMENTS

| | | | |
|---|---|---|---|
| 3,819,317 | * 6/1974 | Higginbotham | 425/535 |
| 4,036,573 | * 7/1977 | Kauffman et al. | 425/529 |
| 4,196,165 | 4/1980 | Michel | 264/530 |
| 4,214,860 | * 7/1980 | Kleimenhagen et al. | 425/529 |
| 4,244,913 | * 1/1981 | Ryder | 425/535 |
| 4,330,255 | 5/1982 | Suzuki | 425/529 |
| 4,376,090 | 3/1983 | Marcus | 264/530 |
| 4,566,871 | 1/1986 | Höne et al. | 425/525 |
| 4,818,212 | 4/1989 | Gibbemeyer | 425/529 |
| 4,883,631 | * 11/1989 | Ajmera | 264/528 |
| 5,035,931 | * 7/1991 | Yamada et al. | 264/528 |
| 5,169,705 | 12/1992 | Coxhead et al. | 425/150 |
| 5,182,122 | * 1/1993 | Uehara et al. | 425/529 |
| 5,200,134 | 4/1993 | Collombin et al. | 264/532 |
| 5,269,672 | 12/1993 | DiGangi, Jr. | 425/150 |
| 5,403,177 | 4/1995 | Priest | 425/529 |

* cited by examiner

Primary Examiner—Robert Davis
(74) Attorney, Agent, or Firm—Locke Reynolds (57) ABSTRACT

A cryogenic stretch blow molding apparatus including a stretching rod mounted to a blow mold rod seal assembly for sliding movement therethrough, into and longitudinally stretching a plastic parison, the stretching rod including a cooling fluid tube defining a cooling fluid inlet port for connection to a source of a cooling fluid and a cooling fluid outlet port to introduce the cooling fluid within the container, and a heater disposed in a cavity defined in the blow mold rod seal assembly for heating the blow mold rod seal assembly so that at least a portion of the stretching rod is maintained at a temperature above a preselected level to prevent accumulation thereon of ice sublimated from water vapor present in the blow air and portions of seals of the blow mold rod seal assembly are maintained at a temperature above a predetermined level to prevent seal failure. A method of stretch blow molding a plastic parison mounted to a parison engagement assembly into a container including stretching the parison by sliding the stretching rod therethrough and into the parison, connecting the cooling fluid inlet port to the source of cooling fluid to introduce the cooling fluid within the container through the cooling fluid outlet port, and heating the blow mold rod seal assembly to maintain at least a portion of the stretching rod above the preselected level, and to maintain portions of seals above the predetermined level.

23 Claims, 5 Drawing Sheets

APPARATUS FOR CRYOGENIC STRETCH BLOW MOLDING

BACKGROUND OF THE INVENTION

1. Field of the Invention

The present invention generally relates to the field of stretch blow molding apparatus for producing plastic containers from parisons, and more particularly concerns stretch blow molding methods and apparatus utilizing cryogenic fluids to cool plastic containers stretch blow molded from parisons.

2. Description of the Prior Art

In biaxially stretch blow molding parisons into plastic containers, a parison may be placed within a blow mold cavity and mounted to a parison engagement assembly, with a stretching rod moved into and along the longitudinal axis of parison, stretching the parison longitudinally. Blow air is introduced into the parison, laterally stretching the parison transverse to the stretching rod. To provide such stretch blow molded containers with heat resistant characteristics, permitting filling with heated fluid, containers may be heat-set to favorably adjust the orientation of the polymers. In order to shorten the operational time required to heat-set stretch blow molded containers, cooling fluids may be introduced within the containers, quickly quenching and heat-setting the container to permit rapid removal from the blow mold.

The introduction of cryogenic liquids through a stretching rod into the interior of a container that has been stretch blow molded from a parison is known in the art, for instance, as disclosed in U.S. Pat. No. 5,182,122. Further, apparatus and method of making a partially crystalline container by stretch blow molding within a hot mold and then injecting a cooling fluid within the blown container is also known, as described in U.S. Pat. No. 4,883,631, and corresponding United Kingdom patent application No. 2,195,287. Introduction of liquid nitrogen within a container for purposes of cooling is disclosed in U.S. Pat. Nos. 5,290,506; 4,375,947 and 4,376, 090. The use of U.S. Pat. Nos. 5,290,506; 4,375,947 and 4,376,009. The use of cryogenic gas is also known in extrusion blow molding, as described in U.S. Pat. No. 3,789,093.

Unfortunately, the use of cryogenic fluids with stretch blow molding apparatus may also cause certain components of the apparatus to cool to a temperature where the apparatus becomes inoperative. In particular, cryogenic fluids may lower the temperature of components in contact with blow air to a level where water vapor present in the blow air sublimates onto surfaces of such cryogenically cooled components, causing an accumulation of water ice on the surfaces. With continued accumulation of water ice, the apparatus may be rendered inoperable. In addition, when the temperature of the sealing surfaces of seals present in a stretch blow mold apparatus decreases below a certain level that is characteristic of the materials from which the seals are formed, the seals may fail catastrophically. As a result, there exists a need for methods and apparatus for preventing accumulation of water ice and seal failure during stretch blow molding using cryogenic fluid.

U.S. Pat. No. 5,182,122 has proposed a solution to problems created by utilizing cryogenic fluids which includes using a stretching rod having an inner tube for delivery of a cooling fluid and a concentric outer tube for delivery of a thermally insulating fluid. Despite the availability of such devices, there exist a need in the art for methods and apparatus which permit the introduction of cryogenic fluid within a stretch blow molded container for rapid cooling while preventing accumulation of water ice and maintaining the integrity of the seals, but without the necessity of providing for delivery of a thermally insulating fluid.

SUMMARY OF THE INVENTION

In order to aid in the understanding of the present invention, it can be stated in essentially summary form that it is directed to methods and apparatus for stretch blow molding a parison into a container including the introduction of a cryogenic fluid within the container for rapid cooling and providing a source of heat to prevent the cryogenic fluid from causing accumulation of water ice and failure of seals.

More specifically, the present invention includes an apparatus for stretch blow molding a plastic parison into a container, for use with a parison engagement assembly for engaging a parison for stretch blow molding within a blow mold. The apparatus includes a blow mold rod seal assembly having a thermally conducting blow manifold, a thermally conductive blow seal housing, and a thermally conductive base plate mounted to a top plate so that the blow seal housing is sandwiched between and in thermal contact with the blow manifold and the base plate.

A blow manifold defines a first stage blow air inlet port for connection to a source of blow air through a blow air fitting, and further defines a second stage blow air inlet port for connection to the source of blow air. The blow manifold also defines an interior cavity first portion disposed in fluid connection with the first and second stage blow air inlet ports, a chamfered countersink communicating with the interior cavity first portion, and a blow air outlet port.

The blow seal housing includes an upper end and a chamfered lower end, with dimensions of the lower end selected for the blow seal housing to be disposed proximate to the blow manifold with the lower end in mating engagement with the countersink. The blow seal housing defines an interior cavity second portion having a generally cylindrical smaller chamber and a coaxial generally cylindrical larger chamber separated from the smaller chamber by a step. The blow seal housing further defines a first low pressure air supply orifice, disposed through the blow seal housing and communicating with the interior cavity second portion. With the blow seal housing engaged with the blow manifold, the smaller chamber is disposed proximate to the interior cavity first portion.

The base plate is disposed proximate to the blow seal housing and defines an interior cavity third portion having a generally cylindrical first chamber and a generally cylindrical second chamber separated by a second step. The dimensions of the first chamber may be selected to correspond with the exterior dimensions of the upper end of the blow seal housing, so that the base plate and the blow seal housing may be mounted together with the upper end in mating engagement with the first chamber and bearing against a portion of the second step. The second chamber is smaller in radius than the larger chamber, and is disposed proximate to and coaxially aligned with the smaller chamber and the larger chamber. The base plate further defines a circumferential first seal slot at the second chamber, and also defines a second low pressure air supply orifice, disposed through the base plate and communicating with the interior cavity third portion.

The top plate defines a plate opening, and has generally planar plate upper and lower surfaces. The plate opening is disposed above the smaller chamber, the larger chamber, and the second chamber, with the plate lower surface proximate to the base plate.

A piston is provided and includes a piston first end, a piston second end, and a generally cylindrical exterior surface having an exterior surface first portion disposed proximate to the piston first end with diameter slightly smaller than the diameter defined by the smaller chamber of the blow seal housing. The exterior surface also has an exterior surface second portion defining a diameter slightly smaller than the diameter defined by the larger chamber of the blow seal housing and disposed intermediate to the piston first and second ends, and further includes an exterior surface third portion defining a diameter slightly smaller than the diameter defined by the second chamber of the base plate and disposed proximate to the piston second end. A circumferential first shoulder is defined between the exterior surface first and second portions, and a circumferential second shoulder is defined between the exterior surface second and third portions. The exterior surface second portion defines a circumferential second seal slot, and the exterior surface first portion defines circumferential third and fourth seal slots, respectively. The exterior surface third portion also defines a circumferential switch slot. The piston defines a piston passage extending therethrough. The piston passage includes a piston passage first portion separated from a larger piston passage second portion by a piston passage step, and a blow seal step disposed at the exterior surface third portion.

The piston is slidably disposed within the interior cavity second and third portions, with the exterior surface first portion proximate to the smaller chamber, the exterior surface second portion proximate to the larger chamber, and the exterior surface third portion proximate to the plate opening. The piston is thus disposed partially within the interior cavity second portion, the interior cavity third portion, and the plate opening, for sliding movement between a first, lowered position separate from the parison engagement assembly, and a second, raised position in contact with the parison engagement assembly. In the first, lowered position, the piston is disposed so that the piston first end is in contact with the countersink of the blow manifold, the first shoulder is in contact with the step of the blow seal housing, and the piston second end is generally flush with the plate upper surface. In the second, raised position, the second shoulder is in contact with the second step and the piston second end is elevated, projecting above the plate upper surface and in contact with the parison engagement assembly.

A flexible, resilient first O-ring seal is disposed in the first seal slot at the second chamber of the base plate, surrounding and bearing against the exterior surface third portion of the piston, making sealing contact between the piston and the interior cavity third portion. A flexible, resilient second O-ring seal is disposed in the second seal slot, surrounding the exterior surface second portion of the piston, and bearing against the blow seal housing at the larger chamber, making sealing contact between the piston and the interior cavity second portion. In addition, a flexible, resilient third O-ring seal is disposed in the third seal slot, surrounding the exterior surface first portion of the piston, and bearing against the blow seal housing at the smaller chamber, and also making sealing contact between the piston and the interior cavity second portion. The O-ring seals may be formed of a flexible, resilient polymeric material. A U-cup seal is disposed in the fourth seal slot, surrounding the exterior surface first portion of the piston, and bearing against the blow seal housing at the smaller chamber.

Disposed within the piston passage second portion is a rod bearing retainer. A rod bearing chamber is defined through and within the rod bearing retainer and includes a rounded, circumferential interior shoulder. The exterior dimensions of the rod bearing retainer are preferably chosen to correspond with the dimensions of the piston passage second portion, so that the upper surface of the rod bearing retainer is flush with the blow seal step and the rod bearing retainer bears against the piston passage step. Disposed within the rod bearing chamber is a rod bearing. The dimensions of the rod bearing may be selected so that the rod bearing fits between the interior shoulder of the rod bearing retainer and the piston passage step. A blow seal is disposed partially within the blow seal step, bearing against the rod bearing retainer. The blow seal, the rod bearing retainer and the rod bearing may be mounted to the piston using a snap ring disposed in a circumferential snap ring slot defined in the blow seal.

A heater is provided for thermal contact with the blow mold rod seal assembly, whereby heat may be introduced into the blow mold rod seal assembly so that a portion of the O-ring seals and the U-cup seal in contact with the blow mold rod seal assembly may be maintained at a temperature above a predetermined level. The predetermined level is chosen so that the O-ring seals and the U-cup seal maintained at temperatures above the predetermined level retain their sealing properties and do not adhere to surfaces disposed in sliding contact with the seals when a cryogenic fluid is utilized to cool plastic containers blow molded from parisons. The heater may include a plurality of first heater elements for heating the blow manifold, with each first heater element mounted at least partially within one of a plurality of first heater element cavities defined in the blow manifold. The heater further includes a plurality of second heater elements for heating the base plate, each second heater element mounted at least partially within one of a plurality of second heater element cavities defined in the base plate. The first and second heater elements may be electrical resistance heater elements connected to a source of electrical power. The first heater elements provide heat energy to the blow manifold, and the second heater elements provide heat energy to the base plate, whereby the blow seal housing, in thermal contact with the blow manifold and the base plate, receives sufficient heat energy so that at least the outer circumferential portion of the second O-ring seal disposed in sliding and sealing contact with the blow seal housing at the larger chamber, and at least the outer circumferential portions of the third O-ring seal and the U-cup seal in sliding and sealing contact with the blow seal housing at the smaller chamber are maintained at a temperature above the predetermined level. In addition, the first heater elements provide sufficient heat energy whereby at least the inner circumferential portion of the first O-ring seal in sliding and sealing contact with the piston at the exterior surface third portion is maintained at a temperature above the predetermined level.

A piston proximity switch is mounted to a switch mounting plate attached to the base plate so as to be disposed within the plate opening and proximate to the piston. A seal extension housing is mounted below the blow manifold with a coupling extending partially within the blow manifold stepped bore defined in the blow manifold and partially within a seal extension housing first stepped bore defined in a seal extension housing upper end. A seal extension bushing is disposed within a seal extension housing second stepped bore defined in a seal extension housing lower end, and the seal extension bushing and an extension housing U-cup seal are mounted to the seal extension housing with a U-cup retainer and U-cup retainer fasteners. A heater band is mounted surrounding the seal extension housing at the seal extension housing lower end. The extension housing U-cup seal acts to prevent blow air provided to the blow manifold from escaping through the seal extension housing.

A tubular stretching rod having a rod lower end including a threaded portion and a rod upper end is mounted to the blow mold rod seal assembly for vertical sliding movement through the U-cup retainer, the seal extension bushing, the seal extension housing, the coupling, the interior cavity first portion, the piston passage, the rod bearing retainer, the rod bearing, the blow seal, and into the parison engagement assembly. In this way, the stretching rod is disposed to move into and longitudinally stretch a parison coupled to the parison engagement assembly, to facilitate stretch blow molding a parison into a container. Further, the stretching rod acts as a cryogenic fluid tube and thus a cryogenic fluid inlet port at the rod lower end for connection to a source of a cryogenic fluid, and further defines a plurality of cryogenic fluid outlet ports at the rod upper end, whereby a cryogenic fluid may be introduced within a container after stretching and blowing.

The first and second heater elements provide heat to the blow manifold, the base plate, the blow seal housing, the piston and the rod bearing so that portions of the stretching rod disposed within the blow manifold, the base plate, the blow seal housing, the piston and the rod bearing are maintained at a temperature above a preselected level, reducing accumulation of water ice on such portions of the stretching rod that may result from sublimation of water vapor present in blow air. The heater band provides heat to portions of the stretching rod proximate to the seal extension housing lower end sufficient to maintain such portions of the stretching rod at a temperature above the preselected level, reducing accumulation of water ice on the stretching rod from sublimation of water vapor present in ambient air.

Vertical movement of the stretching rod is accomplished using a rodless air cylinder assembly including a cylinder support mounted to a mounting plate, and an air cylinder vertically movable with respect to the cylinder support using air supplied though a flow control orifice from a source of compressed air. A stretching rod tooling, having a stretching rod tooling lower surface, is mounted to and beneath the blow manifold. A stop rod is mounted to the air cylinder, and a stretching rod bumper pad is mounted to the stop rod, for contact with the stretching rod tooling lower surface when the air cylinder moves vertically upward. A stretching rod switch mounting bracket is attached to the stretching rod tooling, and supports a cylinder proximity switch, which is electrically connected to the air cylinder assembly. The air cylinder assembly is also electrically connected to the piston proximity switch.

The cylinder assembly may be coupled to a pair of stretching rods using a stretching rod plate mounted to the air cylinder, with each stretching rod for use with one of a pair of stretch blow molding stations. A brace is attached to the stretching rod plate and defines a brace aperture through which the check valve is mounted. A T-fitting is attached below and in fluid connection with the check valve, and a pair of opposing, generally U-shaped tubes are connected to the T-fitting. Each U-shaped tube is fluidly connected to a stretching rod. Further, each stretching rod is adjustably mounted to stretching rod plate with a tapped stretching rod adjustment bracket attached to stretching rod plate, whereby the threaded portion of each stretching rod is threadably engaged with the stretching rod adjustment bracket. The check valve is fluidly connected to a supply tube through which cryogenic fluid, such as liquid nitrogen, may be supplied to the present invention.

Vertical sliding movement of the piston within the blow seal housing, the base plate, and the top plate is controlled by the introduction of low pressure air into the interior cavity second portion of the blow seal housing through the first low pressure air supply orifice, and into the interior cavity third portion of the base plate through the second low pressure air supply orifice. In the first, lowered position, the piston is disposed with the first shoulder in contact with the step of the blow seal housing, and an upper volume is defined within the larger chamber proximate to the upper end of the blow seal housing. With the piston in the lowered position, the upper volume communicates with the second low pressure air supply orifice and the piston proximity switch is disposed in contact with the exterior surface third portion of the piston, outside of the switch slot. In the second, raised position, the piston is disposed with the second shoulder in contact with the second step of the base plate, and a lower volume is defined within the smaller chamber proximate to the lower end of the blow seal housing. With the piston in the raised position, the lower volume communicates with the first low pressure air supply orifice and the piston proximity switch is disposed in engagement with the switch slot.

In use, low pressure air supplied to the lower volume through the first low pressure air supply orifice raises the piston to the second, raised position, while supply of low pressure air to the upper volume through the second low pressure air supply orifice exerts downward pressure to move the piston to the lowered position. The piston proximity switch acts to signal the position of the piston, indicating whether the piston is in the lowered position or not in the lowered position. The first and second O-ring seals act to contain supplied air within the upper volume, and the second and third O-ring seals act to contain supplied air within the lower volume.

With the piston in the raised position, the piston proximity switch moves into the switch slot and activates the air cylinder assembly, whereby the air cylinder moves vertically upward along the cylinder support. Upward movement of the air cylinder is limited by contact of the stretching rod bumper pad with stretching rod tooling lower surface, triggering the cylinder proximity switch to stop movement of the air cylinder.

The stretching rod slides vertically upward through the U-cup retainer, the seal extension bushing, the seal extension housing, the coupling, the interior cavity first portion, the piston passage, the rod bearing retainer, the rod bearing, the blow seal, and the parison engagement assembly, and into the interior of a parison mounted to the parison engagement assembly. By selecting the length of the stop rod, vertical movement of the stretching rod into a parison may be selected to stretch the parison to form a container of a desired size. In addition, fine adjustment of vertical sliding movement of the stretching rod may be made by rotating and threadably advancing the stretching rod with respect to the stretching rod adjustment bracket.

With the piston in the raised position, blow air may be supplied to the present invention, entering the blow manifold through the first and second blow air inlet ports, into the interior cavity first portion, and also into the lower volume thereby providing additional upward pressure against the piston first end. The U-cup seal provides slidable, sealing contact between the piston and the interior cavity second portion to prevent blow air from entering the larger chamber of blow seal housing. Due to upward pressure on the piston from blow air, the blow seal is urged upward against the parison engagement assembly with sufficient force to form a seal permitting blow air to enter a parison engaged therewith. Blow air flows through the interior cavity first portion of the blow manifold, external to the stretching rod, and into the piston passage, the rod bearing retainer, the rod bearing seal, and the blow seal, so that blow air may pass through the parison engagement assembly for blowing a parison into a container.

After stretching and blowing a parison into a container, high pressure blow air is released from the blow air outlet port so that blow air no longer exerts upward pressure on the piston at the piston first end. Low pressure air is then supplied to the upper volume through the second low pressure air supply orifice, exerting downward pressure on the piston at the second shoulder, causing the piston to move downward to the lowered position.

After formation by stretching and blowing from a parison, a container has a relatively high temperature, and such containers may be advantageously cooled by supplying a cryogenic fluid to the interior of the container, cooling and heat-setting the container from within. The present invention provides for such cooling by introducing cryogenic fluid within a container through the supply tube, the check valve, the U-shaped tube, and into the stretching rod through the cryogenic fluid inlet port. Cryogenic fluid then emerges from the stretching rod at the cryogenic fluid outlet ports, within the container, and acts to quickly quench and heat-set the container to permit rapid removal from the blow mold. The cryogenic fluid also cools the stretching rod, the piston, the blow manifold, the blow seal housing, and the base plate, along with the O-ring seals and the U-cup seal.

Cooling of the stretching rod to a temperature below the preselected level may cause water ice to accumulate thereon, with water ice forming from sublimation of water vapor present in blow air flowing around the stretching rod and through the blow manifold, the piston, and the rod bearing. With continued accumulation of water ice, the stretching rod may be prevented from sliding through the blow manifold, the piston, and/or the rod bearing. To prevent this undesirable cooling of the stretching rod, the first and second heater elements heat the blow manifold, the base plate, the blow seal housing, the piston and the rod bearing so that portions of the stretching rod within the blow manifold, the base plate, the blow seal housing, the piston and the rod bearing are maintained at a temperature above the preselected level. In addition, the heater band is provided to reduce accumulation of water ice from ambient air on portions of the stretching rod proximate to the seal extension housing lower end which might prevent sliding movement of the stretching rod through the seal extension housing. The heater band heats portions of the stretching rod to a temperature above the preselected level, eliminating accumulation of water ice resulting from sublimation of water vapor present in ambient air.

Cooling of the O-ring seals and the U-cup seal to a temperature below a predetermined level may cause seal failure and/or adhesion to surface disposed in sliding contact with the seals. To prevent cooling of the sliding contact surfaces of the O-ring seals and the U-cup seal, the first heater elements warm the blow manifold and the second heater elements provide heat energy to the base plate, whereby the blow seal housing is warmed so that at least the outer circumferential sliding contact portions of the first and second O-ring seals and the U-cup seal are maintained at a temperature above the predetermined level. Correspondingly, the first heater elements also warm at least the inner circumferential sliding contact portion of the first O-ring seal to a temperature above the predetermined level.

DESCRIPTION OF THE PREFERRED EMBODIMENTS

The following portion of the specification, taken in conjunction with the drawings, sets forth the preferred embodiments of the present invention. The embodiments of the invention disclosed herein are the best mode contemplated for carrying out this invention in a commercial environment, although it should be recognized and understood that various modifications can be accomplished within the parameters of the present invention.

Referring now to the drawings for a detailed description of the present invention, reference is first made to FIGS. 1–4, generally depicting apparatus 10 for use in stretch blow molding plastic parisons into containers. Apparatus 10 is contemplated for use in simultaneously stretch blow molding a pair of parisons into a pair of containers using a pair of essentially symmetric stretch blow molding stations. As a result, without loss of generality or descriptiveness, the present invention will now be described with respect to only one of the pair stretch blow molding stations, with it understood that the other of the pair of stretch blow molding stations is thereby also described. Apparatus 10 is depicted proximate to parison engagement assembly 12 for engaging a parison for stretch blow molding within a blow mold, not shown. Apparatus 10 includes blow mold rod seal assembly 14 having thermally conducting blow manifold 16, thermally conductive blow seal housing 18, and thermally conductive base plate 20, mounted to top plate 22 with first fasteners, not shown, so that blow seal housing 18 is sandwiched between and in thermal contact with blow manifold 16 and base plate 20. Additionally, base plate 20 may be attached to top plate 22 with second fasteners 24.

Blow manifold 16 defines first stage blow air inlet port 25 for connection to a source of blow air, not shown, through blow air fitting 26, and further defines second stage blow air inlet port 27, depicted in phantom, for connection to the source of blow air. In addition, blow manifold 16 also defines interior cavity first portion 28 disposed in fluid connection with first and second stage blow air inlet ports 25 and 27, chamfered countersink 30 communicating with interior cavity first portion 28, and blow air outlet port, not shown.

Blow seal housing 18 includes upper end 31 and chamfered lower end 32, with dimensions of lower end 32 selected so that blow seal housing 18 may be disposed proximate to blow manifold 16 with lower end 32 in mating engagement with countersink 30 of blow manifold 16. Blow seal housing 18 defines interior cavity second portion 34 having generally cylindrical smaller chamber 36 and coaxially disposed generally cylindrical larger chamber 38 separated from smaller chamber 36 by step 40. As shown in phantom in FIGS. 3–4, blow seal housing 18 further defines first low pressure air supply orifice 42, disposed through blow seal housing 18 and communicating with interior cavity second portion 34. With blow seal housing 18 engaged with blow manifold 16, smaller chamber 36 is disposed proximate to interior cavity first portion 28.

Base plate 20 is disposed proximate to blow seal housing 18 and defines interior cavity third portion 44 having generally cylindrical first chamber 46 and generally cylindrical second chamber 48 separated by second step 49. The dimensions of first chamber 46 may be selected to correspond with the exterior dimensions of upper end 31 of blow seal housing 18, whereby base plate 20 and blow seal housing 18 may be mounted together with upper end 31 in mating engagement with first chamber 46 and bearing against a portion of second step 49. Second chamber 48 is smaller in radius than larger chamber 38, and is disposed proximate to and coaxially aligned with smaller chamber 36 and larger chamber 38. Base plate 20 further defines circumferential first seal slot 50 at second chamber 48, and as illustrated in phantom in FIGS. 3–4, defines second low pressure air supply orifice 51, disposed through base plate 20 and communicating with interior cavity third portion 44.

Top plate 22 defines plate opening 52, and has generally planar plate upper and lower surfaces 53 and 54, respectively. Plate opening 52 is disposed above smaller chamber 36, larger chamber 38, and second chamber 48, with plate lower surface 54 proximate to base plate 20.

Piston 56 is provided and includes piston first end 58, piston second end 60, and generally cylindrical exterior surface 62. Exterior surface 62 has exterior surface first portion 64 disposed proximate to piston first end 58 and having diameter slightly smaller than the diameter defined by smaller chamber 36 of blow seal housing 18. Exterior surface 62 also has exterior surface second portion 66 defining a diameter slightly smaller than the diameter defined by larger chamber 38 of blow seal housing 18 and disposed intermediate to piston first and second ends 58 and 60, and further includes exterior surface third portion 68 defining a diameter slightly smaller than the diameter defined by second chamber 48 of base plate 20 and disposed proximate to piston second end 60. Circumferential first shoulder 70 is defined between exterior surface first and second portions 64 and 66, and circumferential second shoulder 72 is defined between exterior surface second and third portions 66 and 68. Exterior surface second portion 66 defines circumferential second seal slot 76, and exterior surface first portion 64 defines circumferential third and fourth seal slots 78 and 80, respectively. Further, exterior surface third portion 68 defines circumferential switch slot 82. Piston 56 also defines piston passage 84 extending therethrough. Piston passage 84 includes piston passage first portion 86 separated from larger piston passage second portion 88 by piston passage step 89, and blow seal step 90 disposed at exterior surface third portion 68.

Figure 1:
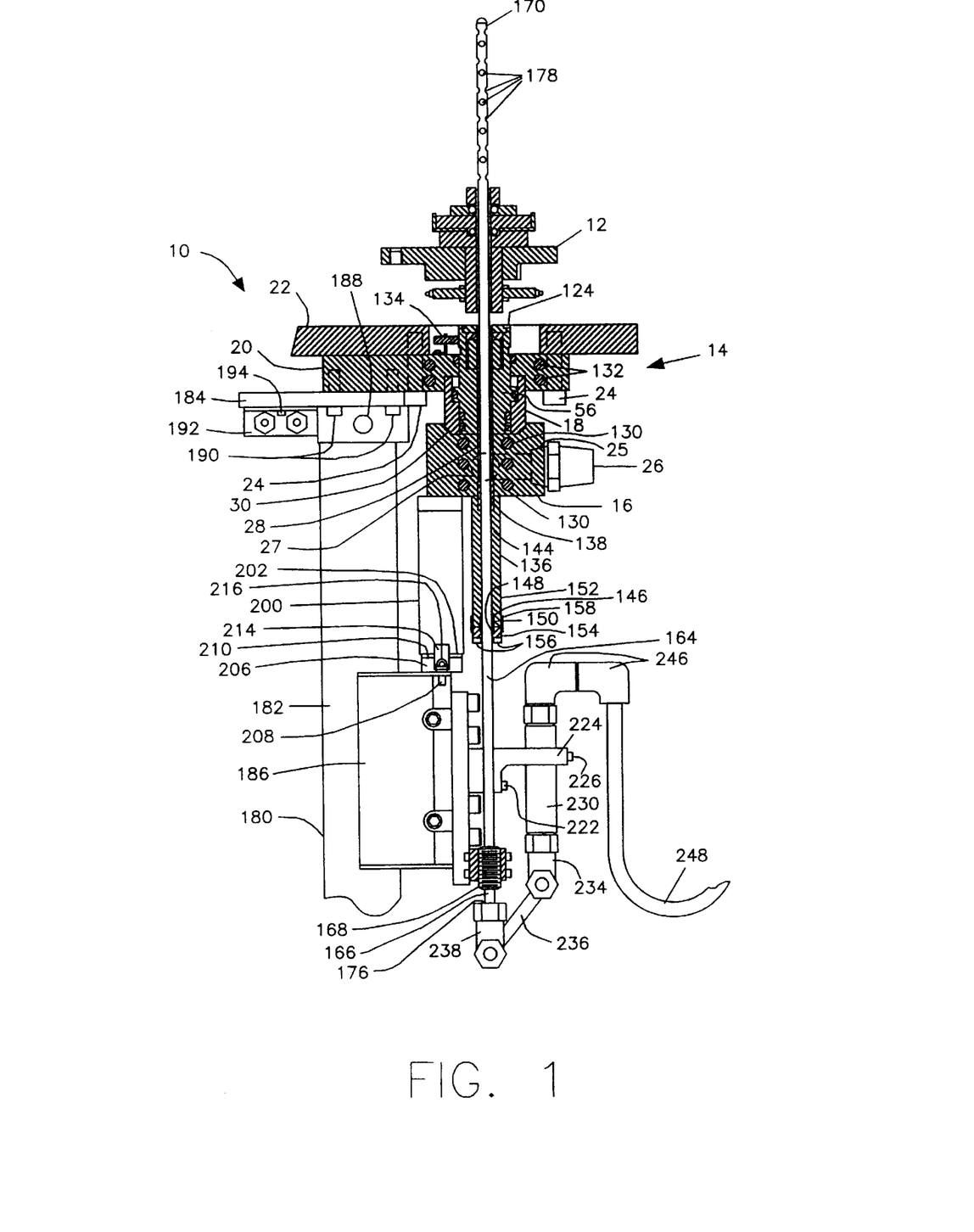
FIG. 1 is an elevational section view of a cryogenic blow molding apparatus representing the present invention with the piston depicted in the lowered position, and the top plate, the cylinder support, and the supply tube shown in fragmentary form.
Figure 2:
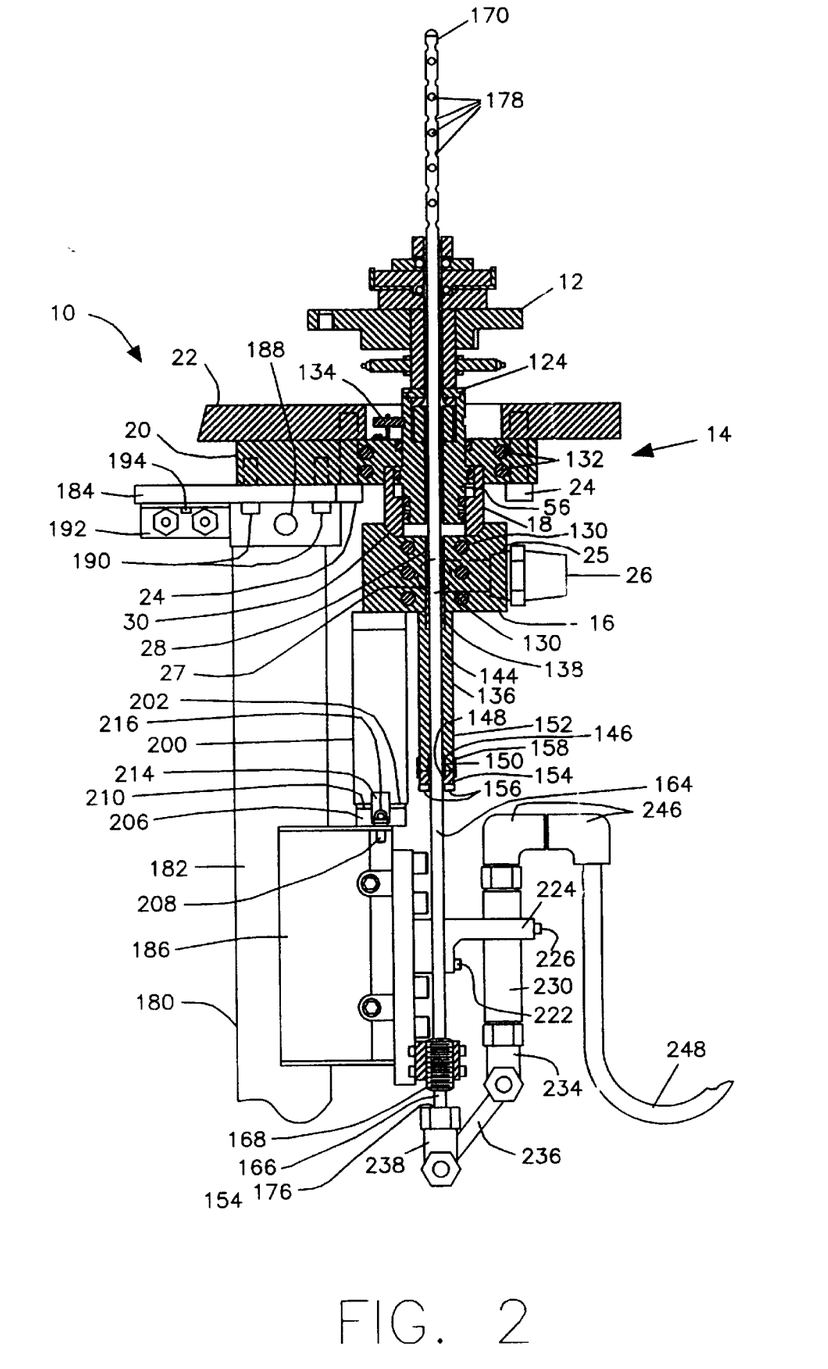
FIG. 2 is an elevational section view of a cryogenic blow molding apparatus representing the present invention with the piston depicted in the raised position, and the top plate, the cylinder support, and the supply tube shown in fragmentary form.
Figure 3:
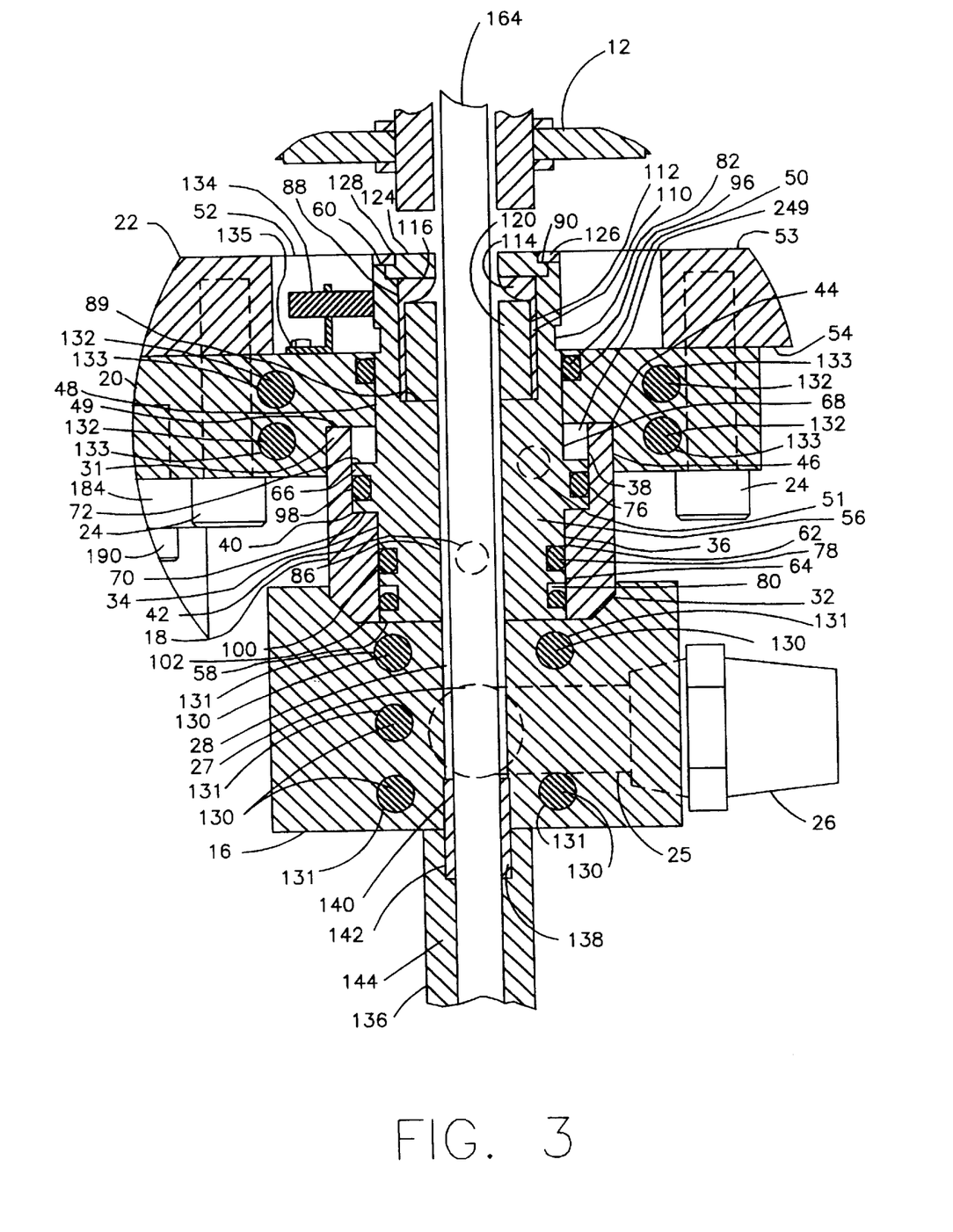
FIG. 3 is an enlarged detail partial section view of a cryogenic blow molding apparatus representing the present invention with the piston depicted in the lowered position.
Figure 4:
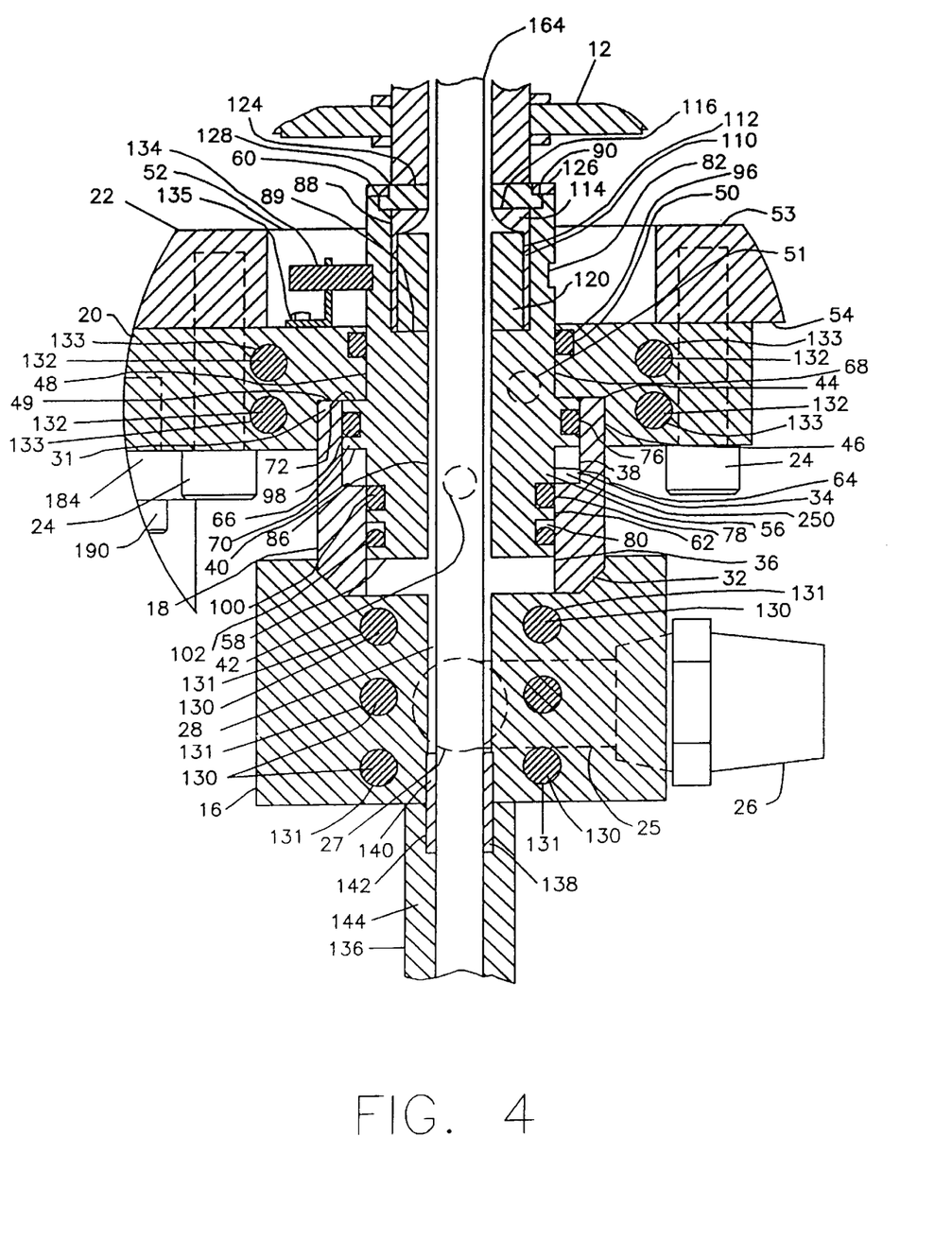
FIG. 4 is an enlarged detail partial section view of a cryogenic blow molding apparatus representing the present invention with the piston depicted in the raised position.

As a result of these dimensions of exterior surface 62, piston 56 may be slidably disposed within interior cavity second and third portions 34 and 44, with exterior surface first portion 64 proximate to smaller chamber 36, exterior surface second portion 66 proximate to larger chamber 38, and exterior surface third portion 68 proximate to plate opening 52. Piston 56 may thus be disposed partially within interior cavity second portion 34, interior cavity third portion 44, and plate opening 52, for sliding movement between a first lowered position separate from parison engagement assembly 12 as shown in FIGS. 1 and 3, and a second raised position in contact with parison engagement assembly 12 as shown in FIGS. 2 and 4. In the first lowered position, piston 56 is disposed so that piston first end 58 is in contact with countersink 30 of blow manifold 16, first shoulder 70 is in contact with step 40 of blow seal housing 18, and piston second end 60 is generally flush with plate upper surface 53. In the second raised position, second shoulder 72 is in contact with second step 49 and piston second end 60 is elevated, projecting above plate upper surface 53 and in contact with parison engagement assembly 12.

Referring to FIGS. 1–4, flexible, resilient first O-ring seal 96 is disposed in first seal slot 50 at second chamber 48 of base plate 20, surrounding and bearing against exterior surface third portion 68 of piston 56, making sealing contact between piston 56 and interior cavity third portion 44. Similarly, flexible, resilient second O-ring seal 98 is disposed in second seal slot 76, surrounding exterior surface second portion 66 of piston 56, and bearing against blow seal housing 18 at larger chamber 38, making sealing contact between piston 56 and interior cavity second portion 34. Further, flexible, resilient third O-ring seal 100 is disposed in third seal slot 78, surrounding exterior surface first portion 64 of piston 56, and bearing against blow seal housing 18 at smaller chamber 36, and also making sealing contact between piston 56 and interior cavity second portion 34. In a preferred embodiment, O-ring seals 96, 98, and 100 are formed of a flexible, resilient polymeric material. U-cup seal 102 is disposed in fourth seal slot 80, surrounding exterior surface first portion 64 of piston 56, and bearing against blow seal housing 18 at smaller chamber 36. Preferably, U-cup seal 102 is formed of a flexible, resilient polymeric material.

As depicted in FIGS. 1–4, disposed within piston passage second portion 88 is rod bearing retainer 110. Rod bearing chamber 112 is defined through and within rod bearing retainer 110 and includes rounded, circumferential interior shoulder 114. The exterior dimensions of rod bearing retainer 110 are preferably chosen to correspond with the dimensions of piston passage second portion 88, so that upper surface 116 of rod bearing retainer 110 is flush with blow seal step 90 and rod bearing retainer 110 bears against piston passage step 89. Disposed within rod bearing chamber 112 is rod bearing 120, preferably formed of a plastic material such as Teflon. The dimensions of rod bearing 120 may be selected so that rod bearing 120 fits between interior shoulder 114 of rod bearing retainer 110 and piston passage step 89. Blow seal 124 is disposed partially within blow seal step 90, bearing against rod bearing retainer 110. Blow seal 124, rod bearing retainer 110, and rod bearing 120 may be mounted to piston 56 using snap ring 126 disposed in circumferential snap ring slot 128 defined in blow seal 124.

One central feature of the present invention is a heater provided for thermal contact with blow mold rod seal assembly 14, whereby heat may be introduced into blow mold rod seal assembly 14 so that a portion of at least one of O-ring seals 96, 98, 100 and U-cup seal 102 in contact with blow mold rod seal assembly 14 may be maintained at a temperature above a predetermined level. The predetermined level is chosen so that O-ring seals 96, 98, and 100, and U-cup seal 102 maintained at temperatures above the predetermined level retain their sealing properties and do not adhere to surfaces disposed in sliding contact with the seals when, as will be described, a cryogenic fluid is utilized to cool plastic containers blow molded from parisons. In a preferred embodiment, where O-ring seals 96, 98, and 100 and U-cup seal 102 are formed of a flexible, polymeric material, the predetermined temperature may be chosen to be about 30° C.

As shown in FIGS. 1–4, the heater may include a plurality of first heater elements 130 for heating blow manifold 16, with each first heater element 130 mounted at least partially within one of a plurality of first heater element cavities 131 defined in blow manifold 16. The heater further includes a plurality of second heater elements 132 for heating base plate 20, each second heater element 132 mounted at least partially within one of a plurality of second heater element cavities 133 defined in base plate 20. In a preferred embodiment, first and second heater elements 130 and 132 may be chosen to be any of a variety of electrical resistance heater elements, such as heater cartridge no. J1062 available from Watlow, Saint Louis, Mo., electrically connected to a source of electrical power, not shown. It will of course be understood that heater elements 130, 132 other than electrical resistance heater elements may be used within the scope of the present invention, including heater elements utilizing conduction, convection, or radiation heating. First heater elements 130 provide heat energy to blow manifold 16, and second heater elements 132 provide heat energy to base plate 20, whereby blow seal housing 18, in thermal contact with blow manifold 16 and base plate 20, receives sufficient heat energy so that the outer circumferential portion of second O-ring seal 98 in sliding and sealing contact with blow seal housing 18 at larger chamber 38, and outer circumferential portions of third O-ring seal 100 and U-cup seal 102 in sliding and sealing contact with blow seal housing 18 at smaller chamber 36 are maintained at a temperature above the predetermined level. In addition, first heater elements 130 provide sufficient heat energy whereby the inner circumferential portion of first O-ring seal 96 in sliding and sealing contact with piston 56 at exterior surface third portion 68 is maintained at a temperature above the predetermined level.

Referring to FIGS. 1–4, piston proximity switch 134 is mounted to switch mounting plate 135, and switch mounting plate 135 is attached to base plate 20 so that piston proximity switch 134 is disposed within plate opening 52 and proximate to piston 56. Seal extension housing 136 is mounted below blow manifold 16 using fasteners, not shown, with coupling 138 extending partially within blow manifold stepped bore 140 defined in blow manifold 16 and partially within seal extension housing first stepped bore 142 defined in seal extension housing upper end 144. Seal extension bushing 146 is disposed within seal extension housing second stepped bore 150 defined in seal extension housing lower end 152, and seal extension bushing 146 and extension housing U-cup seal 148 are mounted to seal extension housing 136 with U-cup retainer 154 and U-cup retainer fasteners 156. Heater band 158, such as Watlow no. MB1N1JN1, is mounted surrounding seal extension housing 136 at seal extension housing lower end 152. Extension housing U-cup seal 148 acts to prevent blow air provided to blow manifold 16 from escaping through seal extension housing 136.

Tubular stretching rod 164 having rod lower end 166 including threaded portion 168 and rod upper end 170 is mounted to blow mold rod seal assembly 14 for vertical sliding movement through U-cup retainer 154, seal extension bushing 146, seal extension housing 136, coupling 138, interior cavity first portion 28, piston passage 84, rod bearing retainer 110, rod bearing 120, blow seal 124, and into parison engagement assembly 12. In this way, stretching rod 164 is disposed to move into and longitudinally stretch a parison coupled to parison engagement assembly 12, to facilitate stretch blow molding a parison into a container in the well-known manner. Additionally, stretching rod 164 acts as a cryogenic fluid tube, and thus defines cryogenic fluid inlet port 176 at rod lower end 166 for connection to a source of a cryogenic fluid, not shown, and further defines a plurality of cryogenic fluid outlet ports 178 at rod upper end 170, whereby a cryogenic fluid may be introduced within a container after stretching and blowing.

First and second heater elements 130 and 132 provide sufficient heat energy to blow manifold 16, base plate 20, blow seal housing 18, piston 56 and rod bearing 120 so that portions of stretching rod 164 disposed within blow manifold 16, base plate 20, blow seal housing 18, piston 56 and rod bearing 120 are maintained at a temperature above a preselected level, reducing accumulation of water ice on such portions of stretching rod 164 resulting from sublimation of water vapor present in blow air. While it will be recognized that the preselected level may be as low as the melting point of water ice, that is, about 0° C., in order to facilitate more rapid melting and evaporation of water ice which may accumulate on stretching rod 164 during cyclic operation of apparatus 10, the preselected level may preferably be chosen to be somewhat higher, for instance about 10° C. In addition, where rapid cycling of apparatus 10 is desired, the preselected level may be chosen at a yet higher level, for instance about 30° C. Similarly, heater band 158 provides sufficient heat energy to portions of stretching rod 164 proximate to seal extension housing lower end 152 sufficient to maintain such portions of stretching rod 164 at a temperature above the preselected level, reducing accumulation of water ice on such portions of stretching rod 164 resulting from sublimation of water vapor present in ambient air.

With reference to FIGS. 1–4, vertical movement of stretching rod 164 is accomplished using rodless air cylinder assembly 180. Air cylinder assembly 180 includes cylinder support 182 mounted to mounting plate 184, and air cylinder 186 vertically movable with respect to cylinder support 182 using air supplied though flow control orifice 188 from a source of compressed air, not shown. Preferably, air cylinder assembly 180 may be selected to be of the rodless air cylinder type, such as rodless air cylinder no. BC2-20-SK20.000-HEO available from Tol-O-Matic, Inc., Hamel, Minn. Mounting plate 184 may be mounted to base plate 20 using mounting plate fasteners 190. In addition, junction box 192 is attached to mounting plate 184 using junction box fastener 194. Stretching rod tooling 200, having stretching rod tooling lower surface 202, is mounted to and beneath blow manifold 16. Stop rod 206 is mounted to air cylinder 186 using stop rod fastener 208, and stretching rod bumper pad 210 is mounted to stop rod 206 for contact with stretching rod tooling lower surface 202 when air cylinder 186 moves vertically upward. Stretching rod switch mounting bracket 214 is attached to stretching rod tooling 200, and supports cylinder proximity switch 216, which is electrically connected to air cylinder assembly 180 through junction box 192. Air cylinder assembly 180 is also electrically connected to piston proximity switch 134.

Figure 5:
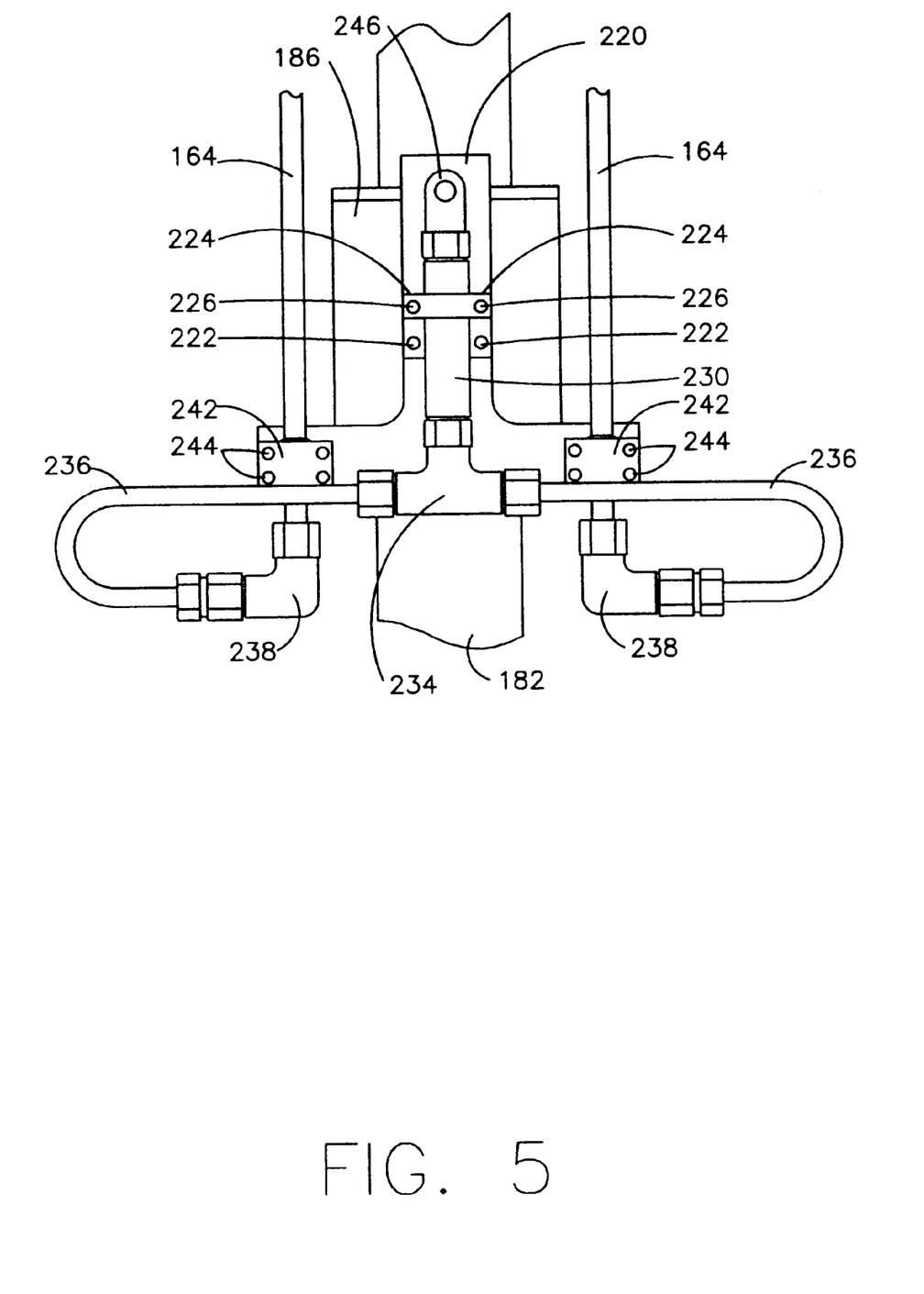
FIG. 5 is a detail section view taken along line 5—5 of FIG. 1.

Referring to FIGS. 1, 2, and 5, air cylinder assembly 180 may be coupled to a pair of stretching rods 164 using generally inverted T-shaped stretching rod plate 220 mounted to air cylinder 186 using stretching rod plate fasteners 222, with each stretching rod 164 for use with one of a pair of stretch blow molding stations, as previously described. Brace 224 is attached to stretching rod plate 220 using brace fasteners 226 and defines brace aperture 228 through which check valve 230 is mounted. T-fitting 234 is attached below and in fluid connection with check valve 230, and a pair of opposing, generally U-shaped tubes 236 are connected to T-fitting 234. Each U-shaped tube 236 is fluidly connected to an elbow fitting 238, and each elbow fitting 238 is fluidly connected to a stretching rod 164. Each stretching rod 164 is adjustably mounted to stretching rod plate 220 with tapped stretching rod adjustment bracket 242 attached to stretching rod plate 220 using adjustment bracket fasteners 244, whereby the threaded portion 168 of each stretching rod 164 is threadably engaged with stretching rod adjustment bracket 242. In addition, check valve 230 is fluidly connected to a pair of input elbow fittings 246, which are in turn fluidly connected to a supply tube 248. Cryogenic fluid, such as liquid nitrogen, is supplied to the present invention through supply tube 248 from the source of cryogenic fluid.

Vertical sliding movement of piston 56 within blow seal housing 18, base plate 18 and top plate 20 is controlled by the introduction of low pressure air into interior cavity second portion 34 of blow seal housing 18 through first low pressure air supply orifice 42, and into interior cavity third portion 44 of base plate 20 through second low pressure air supply orifice 51. In the first, lowered position depicted in FIGS. 1 and 3, piston 56 is disposed with first shoulder 70 in contact with step 40 of blow seal housing 18, and upper volume 249 is defined within larger chamber 38 proximate to upper end 31 of blow seal housing 18. With piston 56 in the lowered position, upper volume 249 communicates with second low pressure air supply orifice 51 and piston proximity switch 134 is disposed in contact with exterior surface third portion 68 of piston 56, outside of switch slot 82. In the second, raised position illustrated in FIGS. 2 and 4, piston 56 is disposed with second shoulder 72 in contact with second step 49 of base plate 20, and a lower volume 250 is defined within smaller chamber 36 proximate to lower end 32 of blow seal housing 18. With piston 56 in the raised position, lower volume 250 communicates with first low pressure air supply orifice 42 and piston proximity switch 134 is disposed in engagement with switch slot 82.

In use, low pressure air supplied to lower volume 250 through first low pressure air supply orifice 42 acts to raise piston 56 to the second, raised position, while supply of low pressure air to upper volume 249 through second low pressure air supply orifice 51 exerts pressure to move piston 56 to the lowered position. Piston proximity switch 134 acts to signal the position of piston 56, indicating whether piston 56 is in the lowered position or not in the lowered position. Piston proximity switch 134 may be selected to be any of a variety of electromechanical proximity switches, such as 8 mm, 24 volt DC switch no. BES-516-384-E4-C3 available from Balluff, Florence, Ky.). First and second O-ring seals 96 and 98 act to contain supplied air within upper volume 249, and second and third O-ring seals act to contain supplied air within lower volume 250.

With piston 56 in the raised position, piston proximity switch 134 moves into switch slot 82 and activates air cylinder assembly 180, whereby air cylinder 186 moves vertically upward along cylinder support 182, to the position depicted in FIGS. 1 and 2. Upward movement of air cylinder 186 is limited by contact of stretching rod bumper pad 210 with stretching rod tooling lower surface 202, triggering cylinder proximity switch 216 to stop movement of air cylinder 186. Cylinder proximity switch 216 may be selected to be any of a variety of available proximity switches, such as the Balluff 8 mm, 24 volt DC switch no. BES-516-384-E4-C3.

Stretching rod 164 slides vertically upward through U-cup retainer 154, seal extension bushing 146, seal extension housing 136, coupling 138, interior cavity first portion 28, piston passage 84, rod bearing retainer 110, rod bearing 120, blow seal 124, and parison engagement assembly 12, and into the interior of a parison mounted to parison engagement assembly 12. By appropriately selecting the length of stop rod 206, vertical movement of stretching rod 164 into a parison may be selected in order to stretch the parison to the extent needed to form a container of a desired size. In addition, fine adjustment of vertical sliding movement of stretching rod 164 may be made by rotating and threadably advancing stretching rod 164 with respect to stretching rod adjustment bracket 242.

With piston 56 in the raised position depicted in FIGS. 2 and 4, blow air may be supplied to the present invention, entering blow manifold 16 through first and second blow air inlet ports 25 and 27, into interior cavity first portion 28, and also into lower volume 250 thereby providing additional upward pressure against piston first end 58. U-cup seal 102 provides slidable, sealing contact between piston 56 and interior cavity second portion 34 to prevent blow air from entering larger chamber 38 of blow seal housing 18. As a result of upward pressure on piston 56 resulting from blow air, blow seal 124 is urged upward against parison engagement assembly 12 with sufficient force to form a seal permitting blow air to enter a parison engaged therewith. Blow air flows through interior cavity first portion 28 of blow manifold 16, external to stretching rod 164, and into piston passage 84, rod bearing retainer 110, rod bearing seal 120, and blow seal 124, whereupon blow air may pass through parison engagement assembly 12 for blowing a parison into a container.

After stretching and blowing a parison into a container, high pressure blow air is released from the blow air outlet port so that blow air no longer exerts upward pressure on piston 56 at piston first end 58. Thereafter, low pressure air is supplied to upper volume 249 through second low pressure air supply orifice 51, exerting downward pressure on piston 56 at second shoulder 72, causing piston 56 to slide downward to the lowered position.

Immediately after formation by stretching and blowing from a parison, a container achieves a relatively high temperature. As previously described, such recently formed containers may be advantageously cooled by supplying a cryogenic fluid to the interior of the container, to cool and heat-set the container from within. The present invention provides for such cooling by introducing cryogenic fluid within a container through supply tube 248, check valve 234, U-shaped tube 236 and into stretching rod 164 through cryogenic fluid inlet port 176. Cryogenic fluid then emerges from stretching rod 164 at cryogenic fluid outlet ports 178, within the container, and acts to quickly quench and heat-set the container to permit rapid removal from the blow mold. Although use of cryogenic fluid to rapidly cool containers is advantageous, such fluid also acts to cool stretching rod 164, piston 56, blow manifold 16, blow seal housing 18, and base plate 20, along with O-ring seals 96, 98, 100 and U-cup seal 102.

Cooling of stretching rod 164 to a temperature below the preselected level may cause water ice to accumulate on stretching rod 164, the water ice forming from sublimation of water vapor present in blow air flowing through blow manifold 16, piston 56, and rod bearing 120, and around stretching rod 164. Continued accumulation of water ice on stretching rod 164 may prevent sliding movement of stretching rod 164 through blow manifold 16, piston 56, and/or rod bearing 120. To prevent this undesirable cooling of stretching rod 164, first heater elements 130 and second heater elements 132 heat blow manifold 16, base plate 20, blow seal housing 18, piston 56 and rod bearing 120 so that portions of stretching rod 164 disposed within blow manifold 16, base plate 20, blow seal housing 18, piston 56 and rod bearing 120 are maintained at a temperature above the preselected level. Further heater band 158 reduces accumulation of water ice from ambient air on portions of stretching rod 164 proximate to seal extension housing lower end 152 which might prevent sliding movement of stretching rod 164 through seal extension housing 136. Heater band 158 heats portions of stretching rod 164 to a temperature above the preselected level, reducing accumulation of water ice on such portions resulting from sublimation of water vapor present in ambient air.

Cooling of O-ring seals 96, 98, 100 and U-cup seal 102 to a temperature below a predetermined level may cause seal failure and/or adhesion to surface disposed in sliding contact with the seals. To prevent cooling of the sliding contact surfaces of O-ring seals 96, 98, 100 and U-cup seal 102, first heater elements 130 warm blow manifold 16 and second heater elements 132 provide heat energy to base plate 20, whereby blow seal housing 18 is warmed so that the outer circumferential portions of first and second O-ring seals 98 and 100 and U-cup seal 102 in sliding contact with low seal housing 18 are maintained at a temperature above the predetermined level. Correspondingly, first heater elements 130 also warm the inner circumferential portion of first O-ring seal 96 in sliding contact with piston 56 to a temperature above the predetermined level.

It will be recognized that in heating stretching rod 164 to a preselected level that is at least about 0° C., first and second heater elements 130 and 132 may necessarily also heat O-ring seals 96, 98, 100 and U-cup seal 102 to a predetermined level that is about 30° C.

The present invention having been described in its preferred embodiments, it is clear that the present invention is susceptible to numerous modifications and embodiments within the ability of those skilled in the art and without the exercise of the inventive faculty. Accordingly, the scope of the present invention is defined as set forth by the scope of the following claims.

What is claimed is:

1. An improved apparatus for stretch blow molding a plastic parison mounted to a parison engagement assembly into a container, having a blow mold rod seal assembly defining a blow air inlet port for connection to a source of blow air and an interior cavity disposed in fluid connection with the blow air inlet port, wherein the improvement comprises:

a stretching rod mounted to the blow mold rod seal assembly for sliding movement through the interior cavity and the passage to move into and longitudinally stretch the parison, the stretching rod including a cooling fluid tube defining a cooling fluid inlet port for connection to a source of a cooling fluid and a cooling fluid outlet port to introduce the cooling fluid within the container; and a heater coupled to the blow mold rod seal assembly for heating the blow mold rod seal assembly whereby a least a portion of the stretching rod is maintained at a temperature above a preselected level preventing accumulation on at least a portion of the stretching rod of water ice sublimated from water vapor present in the blow air.

2. The improved apparatus as recited in claim 1, wherein the heater is mounted at least partially within a heater cavity defined within the blow mold rod seal assembly.

3. The improved apparatus as recited in claim 2, wherein the heater is an electrical resistance heater.

4. An improved apparatus for stretch blow molding a plastic parison mounted to a parison engagement assembly into a container, having a blow mold rod seal assembly defining a blow air inlet port for connection to a source of blow air and an interior cavity having an interior surface and disposed in fluid connection with the blow air inlet port, wherein the improvement comprises:

a stretching rod mounted to the blow mold rod seal assembly for sliding movement through the interior cavity to move into and longitudinally stretch the parison, the stretching rod including a cooling fluid tube defining a cooling fluid inlet port for connection to a source of a cooling fluid and a cooling fluid outlet port to introduce the cooling fluid within the container; and a heater coupled to the blow mold rod seal assembly for heating the blow mold rod seal assembly whereby at least a portion of the stretching rod is maintained at a temperature above a preselected level preventing accumulation on at least a portion of the stretching rod of water ice sublimated from water vapor present in the blow air.

5. The improved apparatus as recited in claim 4 wherein the heater is mounted at least partially within a heater element cavity defined within the blow mold rod seal assembly.

6. The improved apparatus as recited in claim 5 wherein the heater is an electrical resistance heater.

7. An apparatus for stretch blow molding a plastic parison mounted to a parison engagement assembly into a container, comprising:

a blow mold rod seal assembly defining a blow air inlet port for connection to a source of blow air and an interior cavity disposed in fluid connection with the blow air inlet port;

a stretching rod mounted to the blow mold rod seal assembly for sliding movement through the interior cavity to move into and longitudinally stretch the parison, the stretching rod including a cooling fluid tube defining a cooling fluid inlet port for connection to a source of a cooling fluid and a cooling fluid outlet port to introduce the cooling fluid within the container; and a heater coupled to the blow mold rod seal assembly for heating the blow mold rod seal assembly whereby at least a portion of the stretching rod is maintained at a temperature above a preselected level preventing accumulation on at least a portion of the stretching rod of water ice sublimated from water vapor present in the blow air.

8. The apparatus as recited in claim 7, wherein the heater is mounted at least partially within a heater element cavity defined within the blow mold rod seal assembly.

9. The apparatus as recited in claim 7, wherein the heater is an electrical resistance heater.

10. An apparatus for stretch blow molding a plastic parison mounted to a parison engagement assembly into a container, comprising:

a blow mold rod seal assembly defining a blow air inlet port for connection to a source of blow air and an interior cavity disposed in fluid connection with the blow air inlet port;

a stretching rod mounted to the blow mold rod seal assembly for sliding movement through the interior cavity to move into and longitudinally stretch the parison, the stretching rod including a cooling fluid tube defining a cooling fluid inlet port for connection to a source of a cooling fluid and a cooling fluid outlet port to introduce the cooling fluid within the container; and a heater coupled to the blow mold rod seal assembly for heating the blow mold rod seal assembly whereby at least a portion of the stretching rod is maintained at a temperature above a preselected level of about 10° C. preventing accumulation on at least a portion of the stretching rod of water ice sublimated from water vapor present in the blow air.

11. The apparatus as recited in claim 7 wherein the blow mold rod seal assembly includes:

a blow manifold defining the blow air inlet port and a first portion of the interior cavity;

a blow seal housing disposed proximate to the blow manifold and defining a second portion of the interior cavity; and a base plate disposed proximate to the blow seal housing and defining a third portion of the interior cavity.

12. The apparatus as recited in claim 11 wherein the heater includes a first heater element disposed to heat the blow manifold and a second heater element disposed to heat the base plate.

13. The apparatus as recited in claim 12 wherein the first heater element is mounted at least partially within a first heater element cavity defined in the blow manifold and the second heater element is mounted at least partially within a second heater element cavity defined in the base plate.

14. The apparatus as recited in claim 13 wherein the first and second heater elements are electrical resistance heater elements.

15. An apparatus for stretch blow molding a plastic parison mounted to a parison engagement assembly into a container, comprising:

a blow mold rod seal assembly defining a blow air inlet port for connection to a source of blow air and an interior cavity disposed in fluid connection with the blow air inlet port, and including a blow manifold defining the blow air inlet port and a first portion of the interior cavity, a blow seal housing disposed proximate to the blow manifold and defining a second portion of the interior cavity, and a base plate disposed proximate to the blow seal housing and defining a third portion of the interior cavity;

a stretching rod mounted to the blow mold rod seal assembly for sliding movement through the interior cavity to move into and longitudinally stretch the parison, the stretching rod including a cooling fluid tube defining a cooling fluid inlet port for connection to a source of a cooling fluid and a cooling fluid outlet port to introduce the cooling fluid within the container; and a heater coupled to the blow mold rod seal assembly for heating the blow mold rod seal assembly whereby at least a portion of the stretching rod is maintained at a temperature above a preselected level of about 10° C. preventing accumulation on at least a portion of the stretching rod of water ice sublimated from water vapor present in the blow air, wherein the heater includes a first heater element disposed to heat the blow manifold and a second heater element disposed to heat the base plate and wherein the first heater element is mounted at least partially within a first heater element cavity defined in the blow manifold and the second heater element is mounted at least partially within a second heater element cavity defined in the base plate.

16. An apparatus for stretch blow molding a plastic parison mounted to a parison engagement assembly into a container, comprising:

a blow mold rod seal assembly defining a blow air inlet port for connection to a source of blow air and an interior cavity disposed in fluid connection with the blow air inlet port, and including a blow manifold defining the blow air inlet port and a first portion of the interior cavity, a blow seal housing disposed proximate to the blow manifold and defining a second portion of the interior cavity, and a base plate disposed proximate to the blow seal housing and defining a third portion of the interior cavity;

a stretching rod mounted to the blow mold rod seal assembly for sliding movement through the interior cavity to move into and longitudinally stretch the parison, the stretching rod including a cooling fluid tube defining a cooling fluid inlet port for connection to a source of a cooling fluid and a cooling fluid outlet port to introduce the cooling fluid within the container; and a heater coupled to the blow mold rod seal assembly for heating the blow mold rod seal assembly whereby at least a portion of the stretching rod is maintained at a temperature above a preselected level of about 30° C. preventing accumulation on at least a portion of the stretching rod of water ice sublimated from water vapor present in the blow air, wherein the heater includes a first heater element disposed to heat the blow manifold and a second heater element disposed to heat the base plate and wherein the first heater element is mounted at least partially within a first heater element cavity defined in the blow manifold and the second heater element is mounted at least partially within a second heater element cavity defined in the base plate.

17. An improved apparatus for stretch blow molding a plastic parison mounted to a parison engagement assembly into a container, having a blow mold rod seal assembly defining a blow air inlet port for connection to a source of blow air and an interior cavity disposed in fluid connection with the blow air inlet port, a piston defining a passage therethrough and disposed at least partially within the cavity for sliding movement between a first position separate from the parison engagement assembly and a second position in contact with the parison engagement assembly, and at least one seal disposed between and in sealing contact with the piston and the interior cavity, wherein the improvement comprises:

a stretching rod mounted to the blow mold rod seal assembly for sliding movement through the interior cavity and the passage to move into and longitudinally stretch the parison, the stretching rod including a cooling fluid tube defining a cooling fluid inlet port for connection to a source of a cooling fluid and a cooling fluid outlet port to introduce the cooling fluid within the container; and a heater coupled to the blow mold rod seal assembly for heating the blow mold rod seal assembly whereby a least a portion of the at least one seal in contact with the blow mold rod seal assembly is maintained at a temperature above a predetermined level.

18. The improved apparatus as recited in claim 17, wherein the heater is mounted at least partially within a heater cavity defined within the blow mold rod seal assembly.

19. An apparatus for stretch blow molding a plastic parison mounted to a parison engagement assembly into a container, comprising:

a blow mold rod seal assembly defining a blow air inlet port for connection to a source of blow air and an interior cavity disposed in fluid connection with the blow air inlet port;

a piston defining a passage therethrough and disposed at least partially within the cavity for sliding movement between a first position separate from the parison engagement assembly and a second position in contact with the parison engagement assembly;

at least one seal disposed between and in sealing contact with the piston and the interior cavity;

a stretching rod mounted to the blow mold rod seal assembly for sliding movement through the interior cavity and the passage to move into and longitudinally stretch the parison, the stretching rod including a cooling fluid tube defining a cooling fluid inlet port for connection to a source of a cooling fluid and a cooling fluid outlet port to introduce the cooling fluid within the container; and a heater coupled to the blow mold rod seal assembly for heating the blow mold rod seal assembly whereby at least a portion of the at least one seal in contact with the blow mold rod seal assembly is maintained at a temperature above a predetermined level.

20. The apparatus as recited in claim 19 wherein:

the interior cavity includes a generally cylindrical interior surface;

the piston includes a generally cylindrical exterior surface having a diameter slightly smaller than a diameter defined by the interior surface; and the at least one seal includes at least one flexible, resilient O-ring disposed around the piston, whereby the piston is capable of sliding movement within the cavity with the exterior surface proximate to the interior surface.

21. The apparatus as recited in claim 20 wherein the heater is mounted at least partially within a heater element cavity defined within the blow mold rod seal assembly and at least a circumferential portion of the at least one O-ring is maintained at a temperature above the predetermined level.

22. The apparatus as recited in claim 21, wherein the at least one O-ring is formed of a resilient polymeric material and the predetermined level is about 30° C.

23. The apparatus as recited in claim 22 wherein the heater is an electrical resistance heater.

* * * * *